(12) United States Patent
Takaso et al.

(10) Patent No.: US 10,131,355 B2
(45) Date of Patent: Nov. 20, 2018

(54) VEHICLE TRAVELING CONTROL APPARATUS

(71) Applicant: SUBARU CORPORATION, Tokyo (JP)

(72) Inventors: Yasushi Takaso, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 20 days.

(21) Appl. No.: 15/381,225

(22) Filed: Dec. 16, 2016

(65) Prior Publication Data
US 2017/0225686 A1 Aug. 10, 2017

(30) Foreign Application Priority Data

Feb. 4, 2016 (JP) ................. 2016-020150

(51) Int. Cl.
*B62D 6/00* (2006.01)
*B60W 30/18* (2012.01)
(Continued)

(52) U.S. Cl.
CPC ...... *B60W 30/18163* (2013.01); *B60W 10/06* (2013.01); *B60W 10/184* (2013.01);
(Continued)

(58) Field of Classification Search
CPC ........... B60W 30/18163; B60W 10/06; B60W 10/184; B60W 10/20; B60W 30/12;
(Continued)

(56) References Cited

U.S. PATENT DOCUMENTS

2009/0125204 A1* 5/2009 Kudo ............... B60W 30/16
701/96
2010/0211270 A1* 8/2010 Chin ............... B60W 40/09
701/44

(Continued)

FOREIGN PATENT DOCUMENTS

| JP | 2001-022444 A | 1/2001 |
| JP | 2013-173383 A | 9/2013 |
| JP | 2014-051241 A | 3/2014 |

OTHER PUBLICATIONS

Office Action issued in corresponding Japanese Patent Application No. 2016-020150, dated Sep. 5, 2017.

*Primary Examiner* — Shardul D Patel
(74) *Attorney, Agent, or Firm* — McDermott Will & Emery LLP

(57) ABSTRACT

A vehicle traveling control apparatus includes an obtaining unit, a detector, and a controller. The obtaining unit obtains traveling environment information. The traveling environment information includes at least lane line information of a lane along which an own vehicle travels and preceding vehicle information. The detector detects traveling information of the own vehicle. The controller performs a steering control on a basis of the traveling environment information and the traveling information. When the obtaining unit obtains only the lane line information and when the obtaining unit obtains both the lane line information and the preceding vehicle information, the controller performs the steering control on a basis of the lane line information.

17 Claims, 11 Drawing Sheets

(51) Int. Cl.
| | |
|---|---|
| *B60W 10/06* | (2006.01) |
| *B60W 10/184* | (2012.01) |
| *B60W 10/20* | (2006.01) |
| *B60W 30/12* | (2006.01) |
| *B60W 30/165* | (2012.01) |
| *B60W 50/14* | (2012.01) |
| *G05D 1/02* | (2006.01) |
| *G08G 1/0967* | (2006.01) |
| *G08G 1/16* | (2006.01) |
| *B62D 15/00* | (2006.01) |
| *G08G 1/0962* | (2006.01) |
| *B62D 15/02* | (2006.01) |
| *G06K 9/00* | (2006.01) |
| *G01S 13/93* | (2006.01) |

(52) U.S. Cl.
CPC ............ *B60W 10/20* (2013.01); *B60W 30/12* (2013.01); *B60W 30/165* (2013.01); *B60W 50/14* (2013.01); *B62D 15/00* (2013.01); *B62D 15/025* (2013.01); *B62D 15/026* (2013.01); *G05D 1/0212* (2013.01); *G05D 1/0219* (2013.01); *G05D 1/0287* (2013.01); *G06K 9/00798* (2013.01); *G08G 1/0962* (2013.01); *G08G 1/096708* (2013.01); *G08G 1/167* (2013.01); *B60W 2050/146* (2013.01); *B60W 2550/22* (2013.01); *B60W 2550/30* (2013.01); *B60W 2710/20* (2013.01); *B60W 2720/10* (2013.01); *G01S 2013/935* (2013.01); *G01S 2013/936* (2013.01); *G01S 2013/9321* (2013.01); *G01S 2013/9325* (2013.01); *G01S 2013/9342* (2013.01); *G01S 2013/9346* (2013.01); *G01S 2013/9353* (2013.01); *G01S 2013/9364* (2013.01); *G01S 2013/9367* (2013.01); *G05D 2201/0213* (2013.01)

(58) Field of Classification Search
CPC ............... B60W 30/165; B60W 50/14; B60W 2050/146; B60W 2550/146; B60W 2500/22; B60W 2550/30; B60W 2710/20; B60W 2710/10; B62D 15/00; G01S 13/931; G05D 13/931; G05D 1/0212; G05D 1/0219; G05D 1/0287; G05D 2201/0213; G05D 1/02; G06K 9/00791; G08G 1/0962; G08G 1/096708; G08G 1/167
USPC ................ 701/36, 41, 96; 382/103; 340/902
See application file for complete search history.

(56) References Cited

U.S. PATENT DOCUMENTS

| | | | |
|---|---|---|---|
| 2012/0161980 A1* | 6/2012 | Bonne | B60W 30/09 340/905 |
| 2013/0226402 A1* | 8/2013 | Tsuruta | G08G 1/166 701/36 |
| 2014/0097748 A1* | 4/2014 | Kato | B60Q 9/008 315/77 |
| 2014/0098997 A1* | 4/2014 | Faber | G06K 9/00825 382/103 |
| 2014/0110316 A1* | 4/2014 | Shiue | B01D 41/02 210/85 |
| 2015/0088382 A1* | 3/2015 | Obuchi | B60K 31/00 701/41 |
| 2017/0326981 A1* | 11/2017 | Masui | B60K 31/0008 |

* cited by examiner

VEHICLE TRAVELING CONTROL APPARATUS

CROSS-REFERENCE TO RELATED APPLICATIONS

The present application claims priority from Japanese Patent Application No. 2016-020150 filed on Feb. 4, 2016, the entire contents of which are hereby incorporated by reference.

BACKGROUND

The technology relates to a vehicle traveling control apparatus that recognizes a surrounding environment of a traveling own vehicle, and performs a steering control based on a lane line of a lane along which the own vehicle travels or a steering control to follow a preceding vehicle.

Various techniques utilizing a drive assist control or an automatic drive control have been developed and put into practical use, in order for a driver to drive a vehicle more comfortably. For example, Japanese Unexamined Patent Application Publication (JP-A) No. 2014-51241 discloses a technique of a vehicle control apparatus. The vehicle control apparatus disclosed in (JP-A) No. 2014-51241 detects a lane line in a captured image ahead of an own vehicle, calculates recognition confidence in the lane line, and detects a preceding vehicle traveling ahead of the own vehicle. When the preceding vehicle is detected and the recognition confidence for the lane line is lower than a predetermined value, the vehicle control apparatus moves the own vehicle to allow an inter-vehicle distance between the own vehicle and the preceding vehicle to increase, to thereby allow the recognition confidence for the lane line to be equal to or higher than the predetermined value.

SUMMARY

In circumstances where an inter-vehicle distance between an own vehicle and a preceding vehicle is too small in situations such as a traffic jam to recognize the lane line, the vehicle control apparatus as disclosed in (JP-A) No. 2014-51241 performs a control to automatically follow the preceding vehicle. Such a vehicle control apparatus performs a control for: a case where only lane line information is recognized; a case where both the lane line information and preceding vehicle information are obtained; and a case where only the preceding vehicle information is obtained.

It is desirable to provide a vehicle traveling control apparatus that makes it possible to perform a steering control precisely depending on information to be obtained.

An aspect of the technology provides a vehicle traveling control apparatus including: a traveling environment information obtaining unit that obtains traveling environment information, the traveling environment information including at least lane line information of a lane along which an own vehicle travels and preceding vehicle information; a traveling information detector that detects traveling information of the own vehicle; and a controller that performs a steering control on a basis of the traveling environment information and the traveling information. When the traveling environment information obtaining unit obtains only the lane line information and when the traveling environment information obtaining unit obtains both the lane line information and the preceding vehicle information, the controller performs the steering control on a basis of the lane line information.

DETAILED DESCRIPTION

In the following, some implementations of the technology are described with reference to the accompanying drawings.
(First Implementation)

Figure 1:
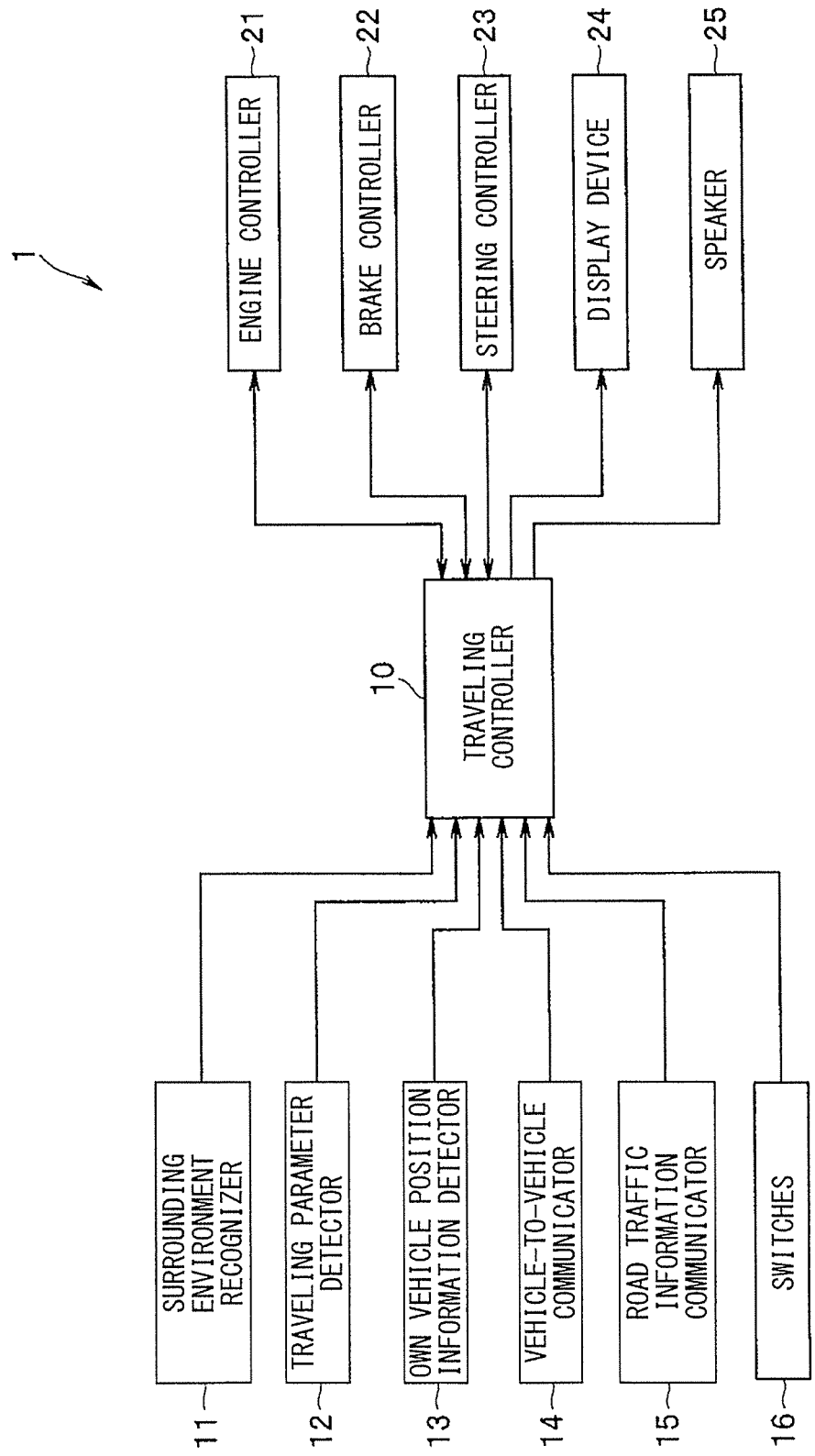
FIG. 1 illustrates an overall configuration of a vehicle traveling control apparatus according to a first implementation of the technology.

FIGS. 1 to 5 illustrate a first implementation of the technology. Referring to FIG. 1, a vehicle traveling control apparatus 1 includes a traveling controller 10. To the traveling controller 10, as input devices, a surrounding environment recognizer 11, a traveling parameter detector 12, an own vehicle position information detector 13, a vehicle-to-vehicle communicator 14, a road traffic information communicator 15, and switches 16 may be coupled. To the traveling controller 10, as output devices, an engine controller 21, a brake controller 22, a steering controller 23, a display device 24, and a speaker 25 may be coupled. The speaker 25 as used herein encompasses a buzzer.

The surrounding environment recognizer 11 may include a camera and a reflected wave receiver which are unillustrated. The camera may have an element such as solid-state imaging element. The camera may be provided in a vehicle interior, and may capture an image of an environment outside a vehicle to obtain image information. The camera may be, for example but not limited to, a stereo camera, a monocular camera, or a color camera. The reflected wave receiver may be one or both of, for example but not limited to, a radar and a sonar. The radar and the sonar each may receive a reflected wave derived from a three-dimensional object present around the vehicle. The radar may be, for example but not limited to, a laser radar or a millimeter-wave radar.

When the camera of the surrounding environment recognizer 11 is the stereo camera, the stereo camera may include, for example, a pair of cameras that stereoscopically capture an object outside the vehicle from different points of views, and a stereo image processor that processes image data obtained from the cameras. The pair of cameras may be attached to a front portion of a ceiling in a vehicle interior at a certain interval from each other. The processing of image data obtained from the cameras may be performed in the stereo image processor, in the following example manner.

First, on a basis of a shift amount between corresponding positions in a pair of stereo images captured by the cameras in an advancing direction of the own vehicle, distance information may be determined to generate a distance image.

In recognition of data of the lane lines such as, but not limited to, white lines, a change in luminance in a width direction of a road may be evaluated on the grounds that the white lines are higher in luminance than a road surface. By performing the evaluation, positions of the right and the left lane lines in an image plane may be identified on the image plane. Positions in real space (x, y, z) of the lane line may be calculated by any expression of coordinate transformation, on the basis of the positions (i, j) on the image plane and a parallax calculated from the positions on the image plane, i.e., on the basis of the distance information. In this implementation, without limitation, a coordinate system in the real space, set on the basis of a position of the own vehicle as a reference, may be defined as follows. As illustrated by way of example in FIG. 4, a vehicle length direction, i.e., a distance direction, may be an X axis, a vehicle width direction may be a Y axis, and a vehicle height direction may be a Z axis, where the road surface immediately below a position in the midpoint of the cameras is defined as the origin O. An X-Y plane where z is equal to zero (0) is coincident with the road surface when the road is flat. For obtaining a road model, a traveling lane on the road on which the own vehicle travels may be divided into a plurality of sections in the distance direction, and, for example, least square method may be applied to a group of points constituting each of the right and the left lane lines in each section to thereby approximate the right and the left lane lines in each section with a quadratic curve as represented by the following expression (1).

$$y = A \cdot x^2 + B \cdot x + C \qquad (1)$$

On the basis of data of the distance image representing a three-dimensional distance distribution, the surrounding environment recognizer 11 may perform a grouping processing, and may perform comparison with data such as three-dimensional road shape data and three-dimensional object data that are stored in advance to extract side-wall data on a guardrail, a curb, and a medial strip present along the road, and data on three-dimensional objects such as vehicles. As the three-dimensional object data, a distance from the own vehicle to the three-dimensional object and a temporal change of the distance (relative speed with respect to the own vehicle) may be determined. In particular, a vehicle having the following characteristics may be extracted as a preceding vehicle. That is, the vehicle which is present on the advancing route of the own vehicle; is closest to the own vehicle; and travels at a predetermined speed (e.g., 0 km/h or higher) in the substantially the same direction as the own vehicle. Information on ON/OFF of a turn signal switch of the vehicle extracted as the preceding vehicle may be detected utilizing factors such as a change in luminance in the image information. It is to be noted that a vehicle having a speed of about 0 km/h, out of preceding vehicles, may be recognized as a preceding vehicle that is stopped.

The surrounding environment recognizer 11 may detect the position of a reflected three-dimensional object (distance and angle) together with the speed on the basis of information on a reflected wave obtained by a radar. In one implementation, the surrounding environment recognizer 11 may serve as a traveling environment information obtaining unit.

The traveling parameter detector 12 may detect information on traveling of the own vehicle. Specific examples of the traveling information may include factors such as, but not limited to, a vehicle speed, acceleration, a steering torque, a steering wheel angle, a yaw rate, an acceleration position, a throttle opening angle, a gradient of a road surface on which the own vehicle travels, and an estimate on a friction coefficient of the road surface. In one implementation, the traveling parameter detector 12 may serve as a traveling information detector.

The own vehicle position information detector 13 may be, for example but not limited to, a navigation system. The own vehicle position information detector 13 may receive an electric wave sent from, for example but not limited to, a global positioning system (GPS), and detect a current position, on the basis of information on the received electric wave. By detecting the current position, the own vehicle position information detector 13 may identify a position of the own vehicle on map data. The map data may be stored in advance on a recording medium such as, but not limited to, a flash memory, a compact disc (CD), a digital versatile disc (DVD), a Blu-ray (Registered Trademark) disc, and a hard disk drive (HDD).

The map data stored in advance may include road data and facility data. The road data may include, for example but not limited to, information on positions of links, information on types of the links, information on positions of nodes, information on types of the nodes, information on curvature of curves (radius of curves), and information on a relationship in connection between the nodes and the links. In other words, the road data may include information on branching and a junction of a road, information on a maximum vehicle speed at a branch road, and any other information. The facility data may include a plurality of records for each facility. The records each may include data that indicates, for example but not limited to, information on name of a relevant facility, information on a location of the facility, and information on a type of the facility which may be classified into a department store, a store, a restaurant, a parking lot, a park, and a place for repairing upon a vehicle malfunction. The own vehicle position information detector 13 may display the position of the own vehicle on the map, and allow an operator to input a destination. Upon the input of the destination, the own vehicle position information detector 13 may perform a predetermined calculation on a route from the place of departure to the destination. The own vehicle position information detector 13 may display the calculated route on the display device 24 such as, but not limited to, a display and a monitor, and may guide the driver by voice by means of the speaker 25 to allow for full command of guidance. In one implementation, the own vehicle position information detector 13 may serve as the traveling environment information obtaining unit.

The vehicle-to-vehicle communicator 14 may be a short-range wireless communicator that may have a communication area of about 100 m such as, but not limited to, a wireless local area network (LAN). The vehicle-to-vehicle communicator 14 may perform communication with any other vehicle directly without any intervention of a server, or other means to transmit and receive information. The vehicle-to-vehicle communicator 14 may exchange information such as, but not limited to, vehicle information, traveling information, and traffic environment information with any other vehicle through the mutual communication with that vehicle. The vehicle information may include, for example but not limited to, unique information that indicates a type of a vehicle such as, but not limited to, a passenger car, a truck, and a motorcycle in one implementation. The traveling information may include, for example but not limited to, vehicle speed information, position information, information on lighting of a stop lamp, information on ON/OFF of a turn signal switch that is signaled upon right turn and left turn, and information on blinking of hazard lights upon emergency stop. The traffic environment information may include information subjected to change from situation to situation such as, but not limited to, information on traffic jam and information on construction. In one implementation, the vehicle-to-vehicle communicator 14 may serve as the traveling environment information obtaining unit.

The road traffic information communicator 15 may be a so-called vehicle information and communication system (VICS: Registered Trademark) or any other suitable system that receives information on road traffic. The road traffic information communicator 15 may receive the road traffic information on a real-time basis through an FM multiplex broadcast or from a transmitter on a road, and display the received road traffic information on the previously-stored map data described above. The road traffic information may include information on, for example but not limited to, traffic jam, accident, construction, required time, and parking lot. In one implementation, the road traffic information communicator 15 may serve as the traveling environment information obtaining unit.

The switches 16 may be those related to a drive assist control for a driver. Non-limiting examples of the switches 16 may include: a switch that performs a constant speed traveling control in which a speed is set to a previously-set constant speed; a switch that performs a follow-up control in which an inter-vehicle distance or inter-vehicle time between the own vehicle and the preceding vehicle is kept to a previously-set constant value; a switch that performs a lane-keeping control in which a traveling lane is kept to a set lane to carry out a traveling control; a switch that performs a control which prevents an occurrence of deviation from the traveling lane, a switch that allows for execution of an overtaking control which overtakes the preceding vehicle or a vehicle to be overtaken; a switch that executes an automatic driving control which causes some or all of the controls described above to be performed in a coordinated manner; a switch that sets factors necessary for each of the controls described above, including a vehicle speed, an inter-vehicle distance, inter-vehicle time, and a speed limit without limitation; and a switch that deactivates any or all of the controls described above.

The engine controller 21 may perform a principal control related to an unillustrated engine of the vehicle, on the basis of the vehicle information. The principal control may include, for example but not limited to, a fuel injection control, an ignition timing control, and an electronic throttle control. The vehicle information may be directed to, for example but not limited to, an intake airflow, a throttle opening angle, an engine water temperature, an intake temperature, a concentration of oxygen, a crank angle, and an accelerator position. When the engine controller 21 receives acceleration necessary (required acceleration) for vehicle controls from the traveling controller 10 during the driving assist or the automatic driving, the engine controller 21 may calculate a driving torque on the basis of the required acceleration to perform the engine control using the driving torque as a target torque. Non-limiting examples of the vehicle controls may include the constant speed traveling control, the follow-up traveling control, the lane-keeping control, the lane deviation prevention control, and the overtaking control.

The brake controller 22 may allow for a control of unillustrated brake devices of four wheels independently of a braking operation performed by the driver, and may perform an antilock brake system (ABS) control and a yaw brake control that controls a yaw moment applied to the vehicle. The brake controller 22 may perform these controls, on the basis of the vehicle information that may be directed to, for example but not limited to, a brake switch, wheel speed of each of the four wheels, the steering wheel angle, and the yaw rate. The yaw brake control may include, for example but not limited to, an antiskid control. Upon receiving deceleration necessary (required deceleration) for vehicle controls from the traveling controller 10 during the automatic driving, the brake controller 22 may set a target fluid pressure of a wheel cylinder of a brake of each wheel on the basis of the required deceleration to perform the brake control. Non-limiting examples of the vehicle controls may include the constant speed traveling control, the follow-up traveling control, the lane-keeping control, the lane deviation prevention control, and the overtaking control.

The steering controller 23 may control assist torque derived from an unillustrated electric power steering motor provided in a steering system of the vehicle, on the basis of the vehicle information that may be directed to, for example but not limited to, the vehicle speed, the steering torque, the steering wheel angle, and the yaw rate. The steering controller 23 may allow for the lane-keeping control in which the traveling lane is kept to carry out the traveling control, the lane deviation prevention control that prevents the occurrence of deviation from the traveling lane, the follow-up traveling control in which the own vehicle may be allowed to travel while following the preceding vehicle, and an automatic driving steering control that carries out these controls in a coordinated manner. The steering controller 23 may receive, from the traveling controller 10, information on the steering wheel angle or the steering torque necessary for the lane-keeping control, the lane deviation prevention control, the follow-up traveling control, and the automatic driving steering control calculated by the traveling controller 10, and may control driving of the electric power steering motor, on the basis of a control amount of the steering wheel angle or the steering torque received from the traveling controller 10.

The display device 24 may provide the driver with visual alerting or visual notification, by means of, for example but not limited to, the monitor, the display, or an alarm lamp. The speaker 25 may provide the driver with aural alerting or aural notification.

The traveling controller 10 may carry out, on the basis of each input signal from the surrounding environment recognizer 11, the traveling parameter detector 12, the own vehicle position information detector 13, the vehicle-to-vehicle communicator 14, the road traffic information communicator 15, and the switches 16, the constant speed traveling control, the follow-up traveling control, the lane-keeping control, the lane deviation prevention control, and other controls in a coordinated manner to perform vehicle controls such as the drive assist control and the automatic driving control. In this case, the vehicle controller 10 may carry out the steering control on the basis of the lane line information, when only the lane line information is obtained and when both the lane line information and the preceding vehicle information are obtained. When the lane line information is not obtained due to narrow inter-vehicle distance between the own vehicle and the preceding vehicle, traveling controller 10 may perform the steering control to follow the preceding vehicle. When detecting a branch road of the lane ahead of the own vehicle and the information on ON of the turn signal switch of the preceding vehicle followed by the own vehicle to show an intention of the preceding vehicle to change lanes toward the branch road, the traveling controller 10 may perform a control to allow the inter-vehicle distance between the own vehicle and the preceding vehicle to be expanded to a distance at which the lane line information is obtainable. In this case, the traveling controller 10 may determine whether a diverging direction of the preceding vehicle coincides with a target course of the own vehicle. When the advancing route of the preceding vehicle that advances toward the branch road coincides with the target course of the own vehicle, the traveling controller 10 may perform the steering control to follow the preceding vehicle. When detecting a branch road of the lane ahead of the own vehicle and the intention of the preceding vehicle followed by the own vehicle to change lanes toward the branch road, the traveling controller 10 may perform a steering control on the basis of a status of obtaining the lane line information after completion of the lane change performed by the preceding vehicle, depending on the traveling state of the own vehicle. More specifically, the traveling controller 10 may prevent the own vehicle that is stopped from starting (in the first implementation of the technology). When the lane line information is obtained after completion of the lane change performed by the preceding vehicle, the traveling controller 10 may allow the own vehicle to start while performing the steering control on the basis of the lane line information. In contrast, when no lane line information is obtained, the traveling controller 10 may prevent the own vehicle from starting, and may stop the steering control in a case where there is occurrence of one or both of a lapse of a predetermined time or a driving operation performed by the driver. Thus, the traveling controller 10 may serve as a control unit.

Figure 2:
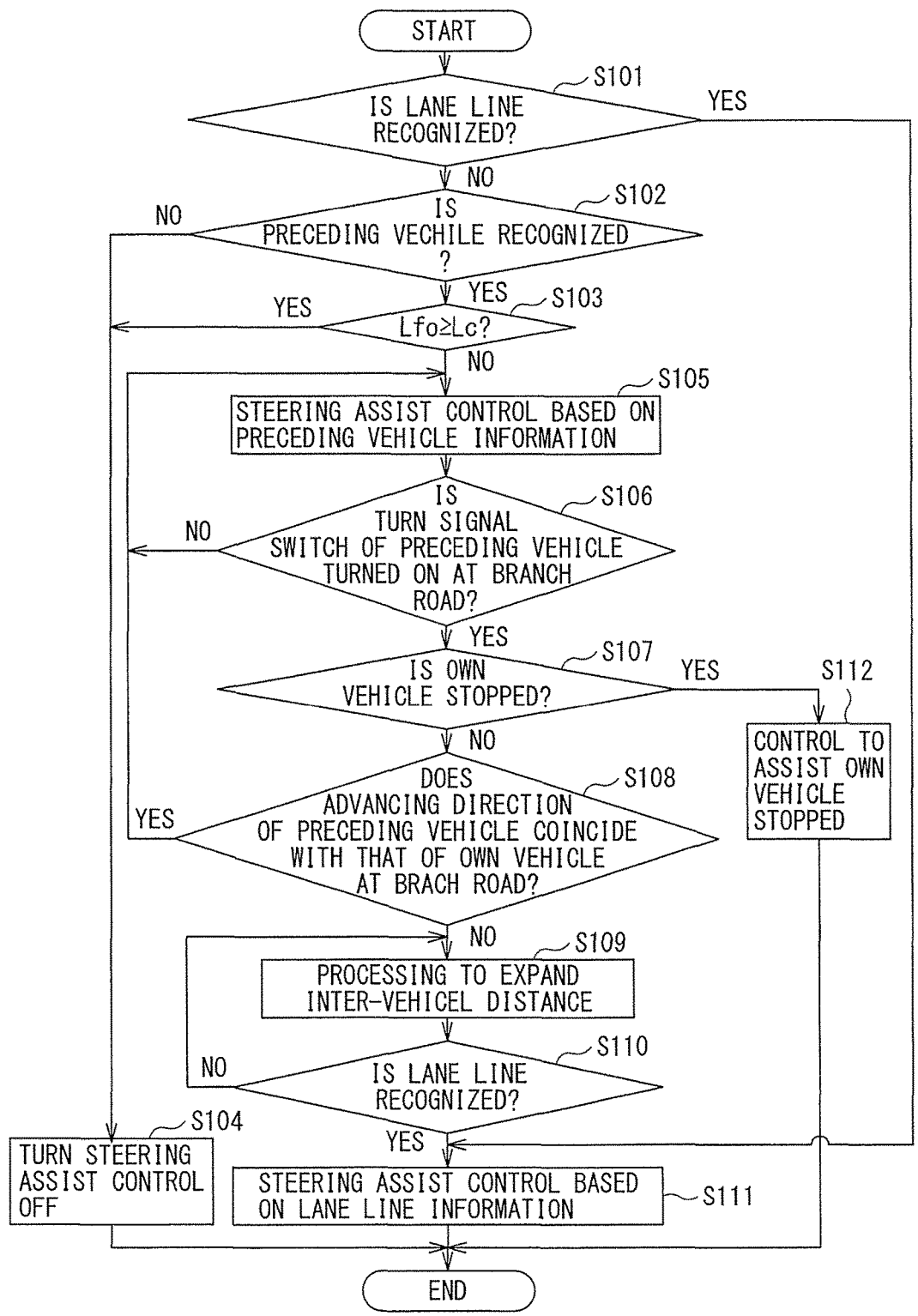
FIG. 2 is a flowchart of an example of a traveling control program according to the first implementation of the technology.

A description is given next, with reference to the flowchart of FIG. 2, of an example of a program of the traveling control to be executed by the traveling controller 10.

First, in step (hereinafter, abbreviated as "S") 101, determination may be made as to whether the lane line is recognized.

As a result of the determination, when the lane line is recognized, the flow may proceed to S111, in which a steering assist control may be performed on the basis of the lane line information.

Figure 4:
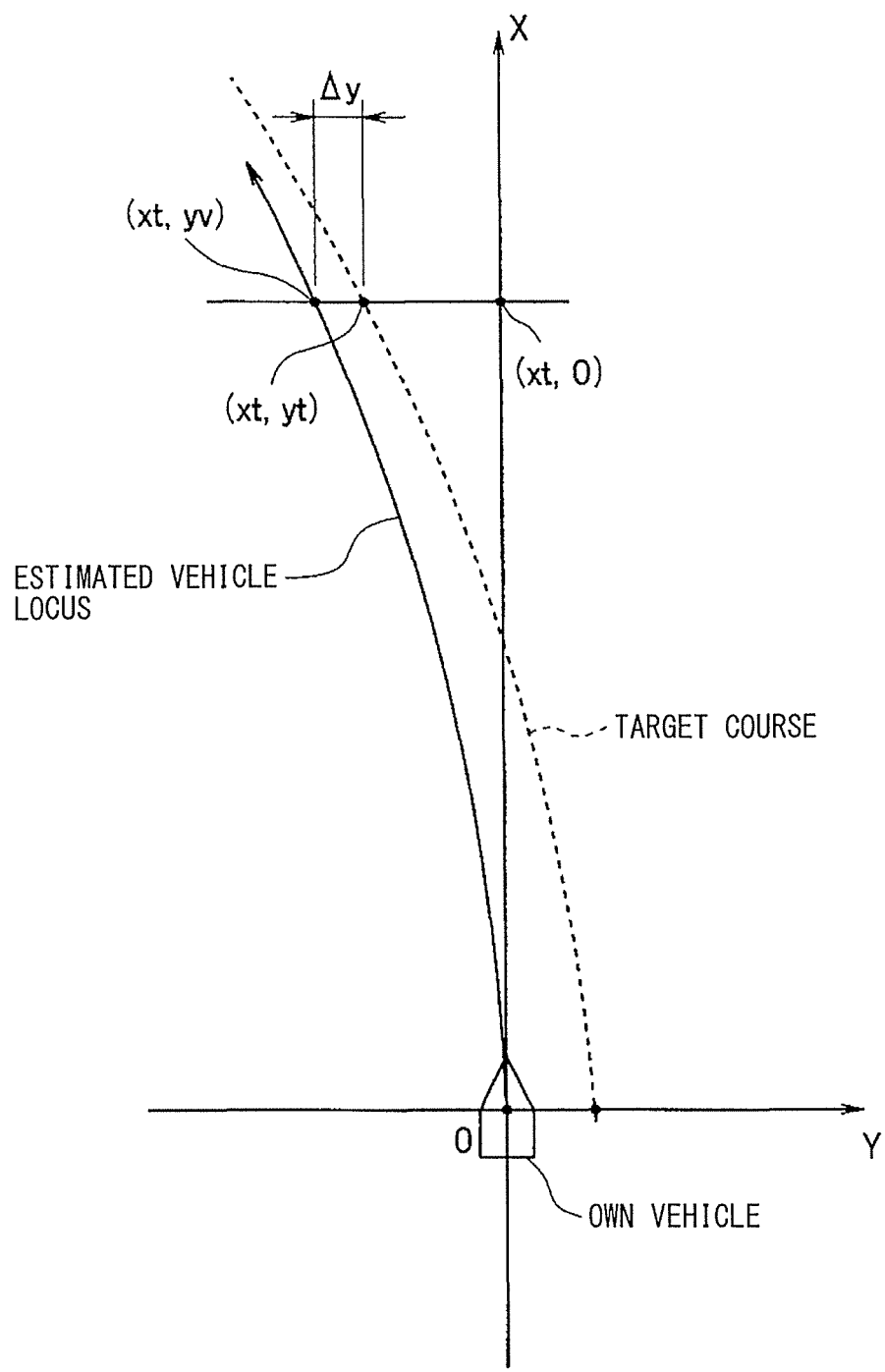
FIG. 4 describes a target course and an estimated vehicle locus on X-Y coordinates according to the first implementation of the technology.

The steering assist control based on the lane line information may be performed as follows, for example. As illustrated in FIG. 4, a target course (e.g., the middle of the lane) of the own vehicle may be set on the basis of the lane line, and may be approximated by the foregoing quadratic curve of the expression (1). The quadratic curve may determine curvature κ of the target course as being equal to 2~A (κ=2·A), and may determine a relative yaw angle θyaw of the target course with respect to an advancing direction of the own vehicle as being equal to $\tan^{-1}(B)$ (θyaw=$\tan^{-1}(B)$).

An estimated advancing route of the own vehicle estimated depending on the current driving state of the own vehicle may be calculated on the basis of the following expression (2) on the basis of an equation of motion of the vehicle, for example.

$$y = (1/2) \cdot (1/(1+As \cdot V^2)) \cdot (\theta p/Lw) \cdot x^2 \qquad (2)$$

where V denotes a speed of the own vehicle, θp denotes a steering wheel angle, As denotes a stability factor unique to the vehicle, and Lw denotes a wheel base.

On the basis of the foregoing example method, coordinates of a control target point obtained by the foregoing target course (represented by the expression (1)) may be set as (xt, yt), and coordinates of the estimated advancing route of the own vehicle shifted in the vehicle width direction from the control target point may be set as (xt, yv), to enable a target steering wheel angle θt to be calculated on the basis of the following expression (3).

$$\theta t = Gff \cdot \kappa + Gfb \cdot (yt - yv) + Gfby \cdot \theta yaw \qquad (3)$$

where Gff denotes a feed forward gain, Gfb denotes a feedback gain, and Gfby denotes a yaw angle feedback gain, each of which may be a preset value.

In the foregoing expression (3), a first operation term may be a feed forward operation term necessary for traveling along the target course; a second operation term may be a feedback operation term directed to correction of a variation, in the vehicle width direction of the own vehicle, at the control target point between the target course and the estimated advancing route; and a third operation term is a feedback operation term directed to correction of a variation in a relative yaw angle between the target course and the own vehicle to allow the estimated advancing route of the own vehicle to coincide with the target course.

The target steering wheel angle θt calculated on the basis of the foregoing expression (3) may be outputted to the steering controller 23.

It is to be noted that, when the steering assist control based on the lane line information is performed, the driver may be informed to that effect on an as-needed basis by means of the display device 24 or the speaker 25. The steering assist control based on the lane line information according to the foregoing expression (3) is merely an example, and the steering assist control is by no means limited to the implementation of the technology.

In contrast, when determination is made that no lane line is recognized in the above-described S101, the flow may proceed to S102, in which determination may be made as to whether the preceding vehicle is recognized.

When determination is made that no preceding vehicle is recognized as a result of the determination made in S102, i.e., when neither lane line nor preceding vehicle is recognized, the flow may proceed to S104. In S104, the steering assist control may be turned OFF, to end the program. It is to be noted that, when the steering assist control is turned OFF, the driver may be informed to that effect on an as-needed basis by means of the display device 24 or the speaker 25.

When determination is made that the preceding vehicle is recognized as a result of the determination made in S102, the flow may proceed to S103.

In S103, determination may be made as to whether an inter-vehicle distance Lfo between the preceding vehicle and the own vehicle is equal to or greater than a distance Lc previously set by means of an experiment, a calculation, or other means.

When determination is made that the inter-vehicle distance Lfo between the preceding vehicle and the own vehicle is equal to or greater than the distance Lc previously set by means of an experiment, a calculation, or other means (Lfo≥Lc) as a result of the determination made in S103, the flow may proceed to S104. In S104, the steering assist control may be turned OFF, to end the program. It is to be noted that, when the steering assist control is turned OFF, the driver may be informed to that effect on an as-needed basis by means of the display device 24 or the speaker 25.

In contrast, when determination is made that the inter-vehicle distance Lfo between the preceding vehicle and the own vehicle is smaller than the distance Lc previously set by means of an experiment, a calculation, or other means (Lfo<Lc), determination may be made that the inter-vehicle distance Lfo between the preceding vehicle and the own vehicle is smaller, and that it is difficult to recognize the lane line. Following the determination, the flow may proceed to S105.

Upon processing of the flow to S105, the steering assist control may be performed on the basis of the preceding vehicle information. The steering assist control based on the preceding vehicle information may be performed, for example, by setting a locus of substantially the middle of a rear surface of the preceding vehicle as a locus of the preceding vehicle, and approximating the locus of the preceding vehicle, as the target course of the own vehicle, with the quadratic curve of the foregoing expression (1). As with the foregoing method described for the steering assist control based on the lane line information, the target steering wheel angle θt may be calculated to allow the estimated advancing route of the own vehicle to coincide with the target course (locus of the preceding vehicle), and the calculated target steering wheel angle θt may be outputted to the steering controller 23. It is to be noted that, when the steering assist control based on the preceding vehicle information is performed, the driver may be informed to that effect on an as-needed basis by means of the display device 24 or the speaker 25.

Next, the flow may proceed to S106, in which determination may be made as to whether a branch road of the lane is detected ahead of the own vehicle, and whether the turn signal switch of the preceding vehicle is turned ON to show an intention of the preceding vehicle to change lanes toward the branch road.

Figure 5:
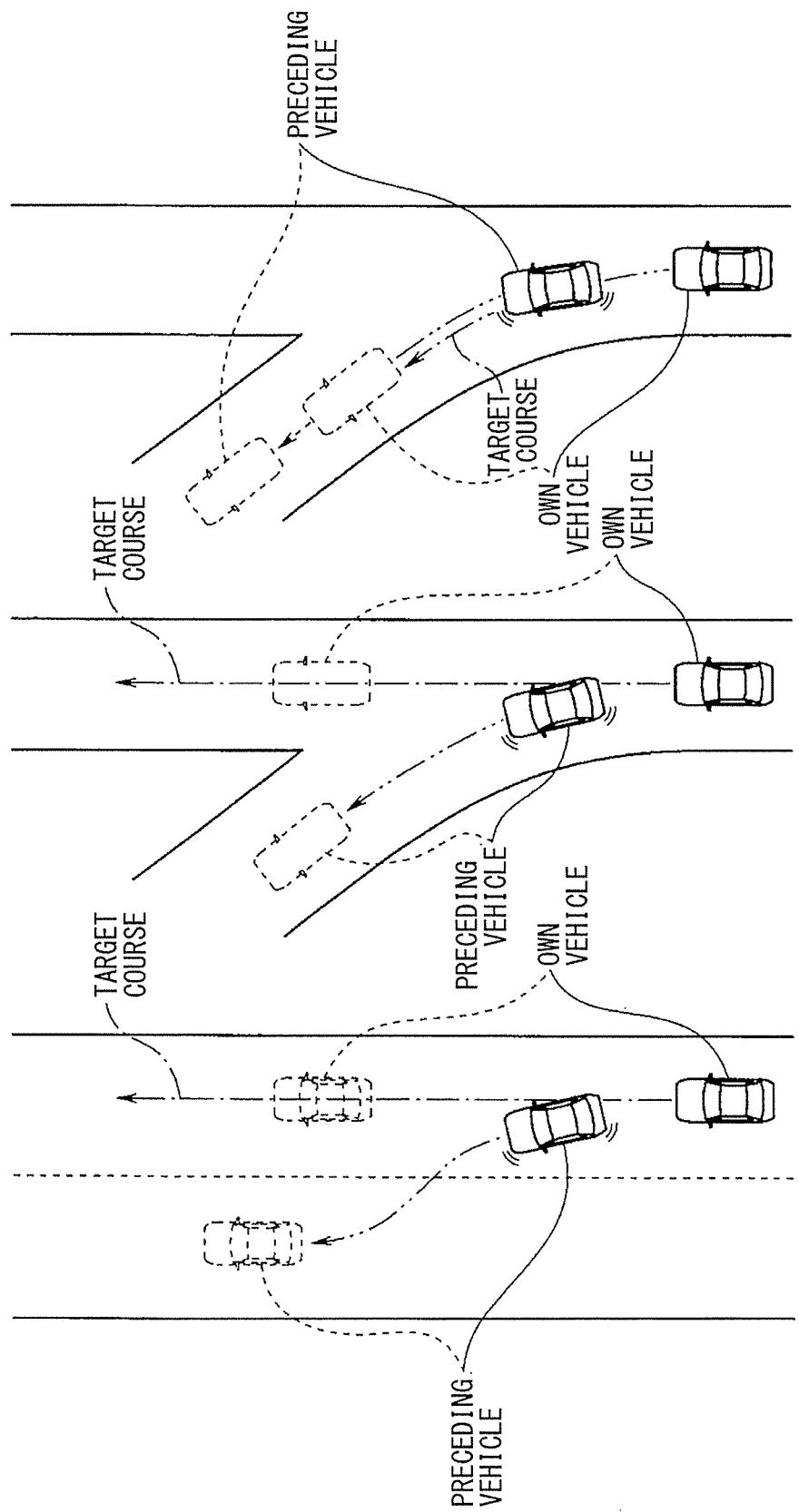
FIG. 5 describes advancing routes of a preceding vehicle and target courses of an own vehicle according to the first implementation of the technology, in which (a) of FIG. 5 illustrates an example of a case where the preceding vehicle changes lanes on a road other than a branch road, (b) of FIG. 5 illustrates an example of a case where the own vehicle travels along the target course without diverging while the preceding vehicle diverges to the branch road, and (c) of FIG. 5 illustrates an example of a case where the advancing route of the preceding vehicle advancing toward the branch road coincides with the target course of the own vehicle.

As a result of the determination, in any of a case out of cases: a case where there is no branch road even though the turn signal switch is turned ON (a case of mere lane change, etc. as illustrated in (a) of FIG. 5); a case where the turn signal switch is not turned ON even though there is a branch road; and a case where there is no branch road and the turn signal switch is not turned ON, the flow may proceed back to S105. In S105, the steering assist control may be performed on the basis of the preceding vehicle information.

When determination is made that a branch road of the lane is detected ahead of the own vehicle, and that the turn signal switch of the preceding vehicle is turned ON to show an intention of the preceding vehicle to change lanes toward the branch road (cases in (b) and (c) of FIG. 5), the flow may proceed to S107.

In S107, determination may be made as to whether the own vehicle is stopped. When the own vehicle is stopped, the flow may proceed to S112, in which the control to assist an own vehicle stopping to be described later may be performed. In contrast, the flow may proceed to S108 when the own vehicle is not stopped.

Upon processing of the flow to S108, determination may be made as to whether the advancing direction of the preceding vehicle coincides with that of the own vehicle at the branch road. In the first implementation of the technology, the advancing direction of the own vehicle may be a guided route set by a navigation system of the own vehicle position information detector 13, and the determination may be made on the basis of whether the diverging direction of the preceding vehicle coincides with the guided route.

When the advancing direction of the preceding vehicle coincides with that of the own vehicle at the branch route (a case in (c) of FIG. 5) as a result of the determination made in S108, the flow may proceed back to S105 to continuously carry out the follow-up control to follow the preceding vehicle. In S105, the steering assist control may be performed on the basis of the preceding vehicle information. It is to be noted that, when the own vehicle changes lanes toward the branch road together with the preceding vehicle, the driver may be informed to that effect, and may be urged to operate the turn signal switch to turn ON, or the turn signal switch may be automatically turned ON.

When the advancing direction of the preceding vehicle does not coincide with that of the own vehicle at the branch route (a case in (b) of FIG. 5) as a result of the determination made in S108, the flow may proceed to S109, in which a control may be performed to expand the inter-vehicle distance between the own vehicle and the preceding vehicle. More specifically, the engine controller 21 (lowering of engine torque) or the brake controller 22 (generation of brake force) may be operated as needed to allow the relative speed of the own vehicle with respect to the preceding vehicle to be lower than the current relative speed. It is to be noted that, when the control to expand the inter-vehicle distance between the own vehicle and the preceding vehicle is performed, the driver may be informed to that effect.

Thereafter, the flow may proceed to S110, in which determination may be made as to whether the lane line is recognizable as a result of the processing to expand the inter-vehicle distance performed in S109.

When the lane line is recognizable as a result of the determination made in S110, the flow may proceed to S111. In S111, the steering assist control based on the lane line information may be performed, to end the program.

When the lane line is not recognizable, the processing from S109 may be repeated.

Figure 3:
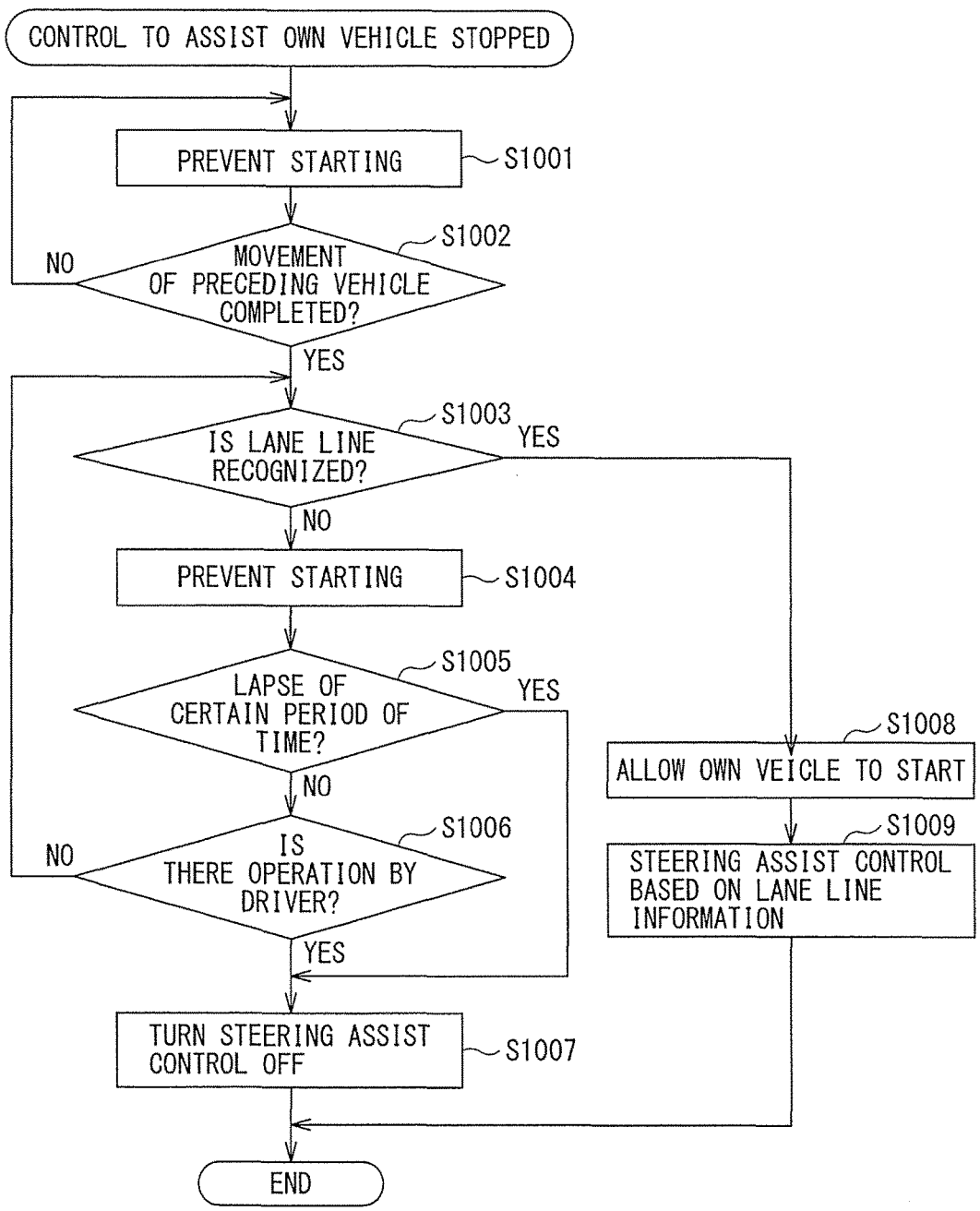
FIG. 3 is a flowchart of an example of a control to assist an own vehicle stopping according to the first implementation of the technology.

Next, description is given, with reference to a flowchart in FIG. 3, on the above-described control to assist an own vehicle stopping in S112, performed on the basis of the determination made in the foregoing S107 that the own vehicle is stopped.

First, in S1001, the own vehicle may be prevented from starting.

Thereafter, the flow may proceed to S1002, in which determination may be made as to whether the movement of the preceding vehicle has been completed, i.e., whether the movement of the preceding vehicle toward the branch road has been completed after showing its intention to diverge by turning the turn signal switch ON.

When the movement of the preceding vehicle has not been completed as a result of the determination made in S1002, the processing from S1001 may be repeated. In contrast, when the movement of the preceding vehicle has been completed, i.e., when the movement of the preceding vehicle toward the branch road has been completed after showing its intention to diverge by turning the turn signal switch ON, the flow may proceed to S1003. In S1003, determination may be made as to whether the lane line is recognizable.

When the lane line is not recognizable, the flow may proceed to S1004 to prevent the own vehicle from starting.

Thereafter, the flow may proceed to S1005, in which determination may be made as to whether there is a lapse of a certain period of time which is previously set by means of an experiment or other means. When there is no lapse of the certain period of time, the flow may proceed to S1006, in which determination may be made as to whether there is any driving operation performed by the driver.

When determination is made that there is no driving operation performed by the driver as a result of the determination made in S1006, the processing from S1003 may be repeated.

When determination is made in S1005 that there is a lapse of the certain period of time, or when determination is made in S1006 that there is a driving operation performed by the driver, the flow may proceed to S1007. In S1007, the steering assist control may be turned OFF, to end the program. It is to be noted that, when the steering assist control is turned OFF, the driver may be informed to that effect on an as-needed basis by means of the display device 24 or the speaker 25.

In contrast, when the lane line is recognized in the foregoing S1003, the flow may proceed to S1008, in which the own vehicle may be allowed to start. Thereafter, the flow may proceed to S1009, in which the steering assist control based on the lane line information may be performed, to end the program.

According to the first implementation of the technology, upon performing the vehicle controls such as the drive assist control and the automatic drive control, the steering control may be performed on the basis of the lane line information, when only the lane line information is obtained and when both the lane line information and the preceding vehicle information are obtained. When the inter-vehicle distance between the own vehicle and the preceding vehicle is small, and thus it is difficult to obtain the lane line information, the steering control to follow the preceding vehicle may be performed. When detecting the branch road of the lane ahead of the own vehicle and the information on ON of the turn signal switch of the preceding vehicle followed by the own vehicle to show the intention of the preceding vehicle to change lanes toward the branch road, the control may be performed to allow the inter-vehicle distance between the own vehicle and the preceding vehicle to be expanded to the distance at which the lane line information is obtainable. In this case, the determination may be made as to whether the diverging direction of the preceding vehicle coincides with the target course of the own vehicle. When the advancing route of the preceding vehicle that advances toward the branch road coincides with the target course of the own vehicle, the steering control to follow the preceding vehicle may be performed. When detecting the branch road of the lane ahead of the own vehicle and the intention of the preceding vehicle followed by the own vehicle to change the lanes toward the branch road, the steering control may be performed on the basis of the status of obtaining the lane line information after the completion of the lane change performed by the preceding vehicle, depending on the traveling state of the own vehicle. More specifically, according to the first implementation of the technology, the own vehicle that is stopped may be prevented from starting. When the lane line information is obtained after the completion of the lane change performed by the preceding vehicle, the own vehicle may be allowed to start while the steering control is performed on the basis of the lane line information. In contrast, when no lane line information is obtained, the own vehicle may be prevented from starting, and the steering control may be stopped in a case where there is occurrence of one or both of the lapse of the predetermined time or the driving operation performed by the driver. Thus, when detecting the branch road of the lane ahead of the own vehicle and the intention of the preceding vehicle followed by the own vehicle to change the lanes toward the branch road, it is possible to perform the steering control precisely depending on the information to be obtained by virtue of proper utilization of the lane line information and the preceding vehicle information, even in a case where the own vehicle is stopped.

(Second Implementation)

Figure 6:
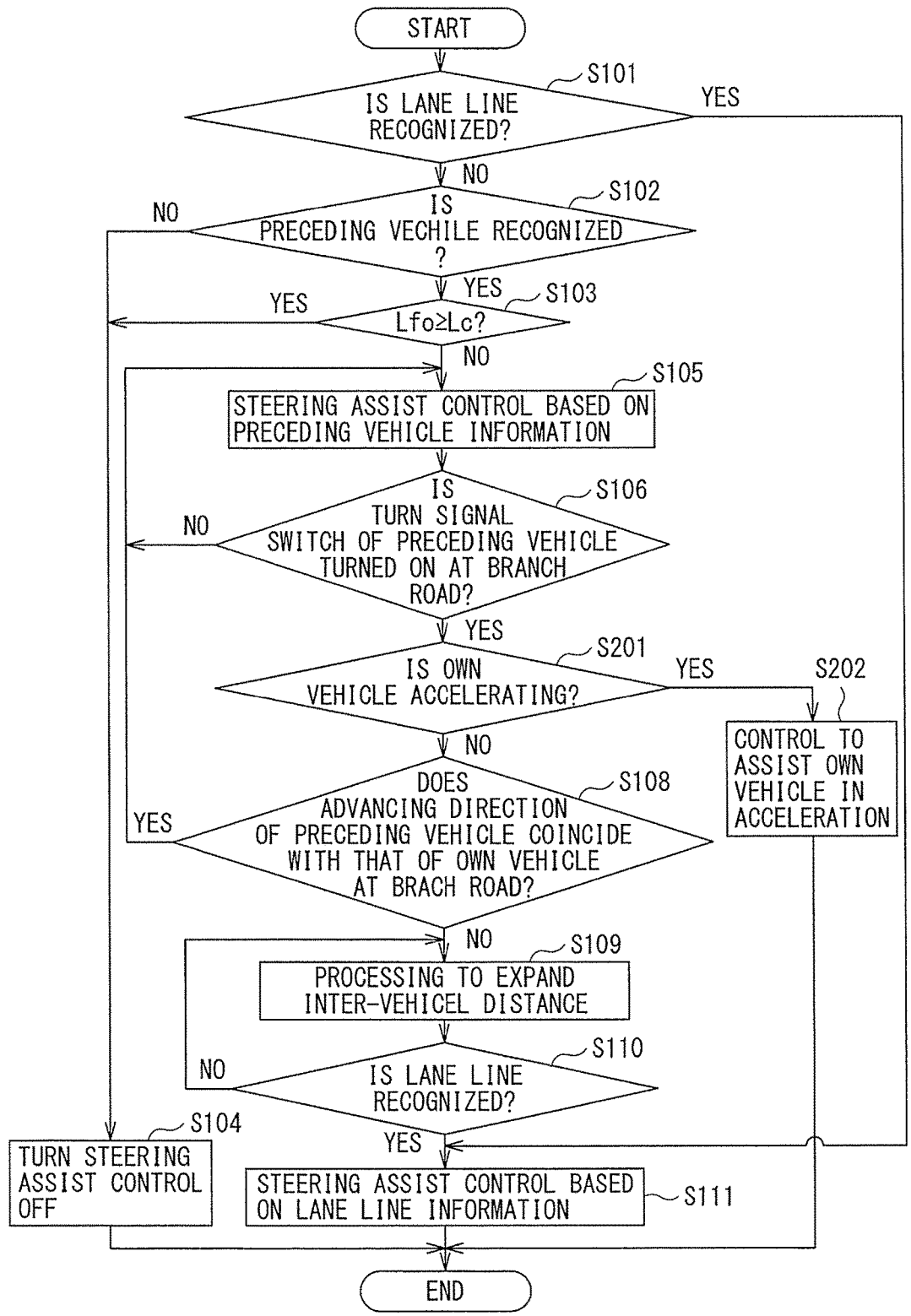
FIG. 6 is a flowchart of an example of a traveling control program according to a second implementation of the technology.
Figure 7:
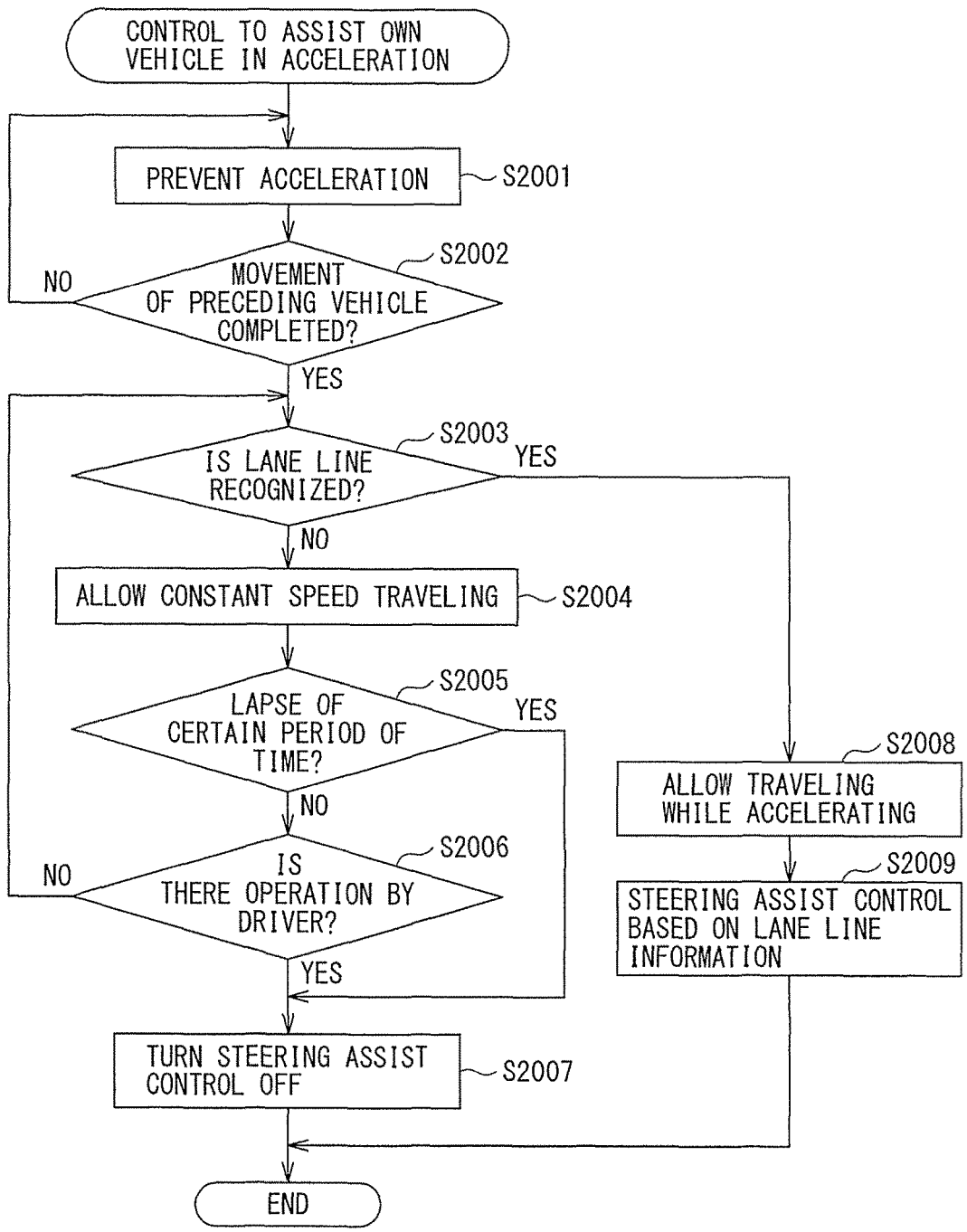
FIG. 7 is a flowchart of an example of a control to assist an own vehicle in acceleration according to the second implementation of the technology.

Next, description is given, with reference to FIGS. 6 and 7, on a second implementation of the technology. The second implementation of the technology is directed to an example where a control may be performed on the basis of determination as to whether the own vehicle is accelerating. The control may be performed when detecting a branch road of the lane ahead of the own vehicle and the intention of the preceding vehicle followed by the own vehicle to change the lanes toward the branch road (a case of (YES) in S106 in FIG. 2 in the first implementation). Other components and functions and effects are similar to those in the first implementation of the technology, and thus the same reference symbol is assigned to the same component to omit a description therefor.

Referring to FIG. 6, the flow may proceed to S106 similarly to the first implementation of the technology. In S106, when the turn signal switch of the preceding vehicle is turned ON, and thus the determination is made that there is an intention of the preceding vehicle to change the lanes toward the branch road (cases in (b) and (c) of FIG. 5), the flow may proceed to S201.

In S201, determination may be made as to whether the own vehicle is accelerating. When the own vehicle is accelerating, the flow may proceed to S202, in which the later-described control to assist the own vehicle in acceleration may be performed. When the own vehicle is not accelerating, the flow may proceed to S108. The processing in and after S108 is similar to the processing in the first implementation of the technology, and thus descriptions therefor are omitted.

Next, description is given, with reference to a flowchart in FIG. 7, on the above-described control to assist the own vehicle in acceleration in S202, performed on the basis of the determination made in the foregoing S201 that the own vehicle is accelerating.

First, in S2001, the own vehicle may be prevented from accelerating.

Thereafter, the flow may proceed to S2002, in which determination may be made as to whether the movement of the preceding vehicle has been completed, i.e., whether the movement of the preceding vehicle toward the branch road has been completed after showing its intention to diverge by turning the turn signal switch ON.

When the movement of the preceding vehicle has not been completed as a result of the determination made in S2002, the processing from S2001 may be repeated. When the movement of the preceding vehicle has been completed, i.e., when the movement of the preceding vehicle toward the branch road has been completed after showing its intention to diverge by turning the turn signal switch ON, the flow may proceed to S2003. In S2003, determination may be made as to whether the lane line is recognizable.

When the lane line is not recognizable, the flow may proceed to S2004 to allow the own vehicle to travel at a constant speed.

Thereafter, the flow may proceed to S2005, in which determination may be made as to whether there is a lapse of a certain period of time which is previously set by means of an experiment or other means. When there is no lapse of the certain period of time, the flow may proceed to S2006, in which determination may be made as to whether there is any driving operation performed by the driver.

When determination is made that there is no driving operation performed by the driver as a result of the determination made in S2006, the processing from S2003 may be repeated.

When determination is made in S2005 that there is a lapse of the certain period of time, or when determination is made in S2006 that there is a driving operation performed by the driver, the flow may proceed to S2007. In S2007, the steering assist control may be turned OFF, to end the program. It is to be noted that, when the steering assist control is turned OFF, the driver may be informed to that effect on an as-needed basis by means of the display device 24 or the speaker 25.

In contrast, when the lane line is recognized in the foregoing S2003, the flow may proceed to S2008, in which the own vehicle may be allowed to travel while accelerating. Thereafter, the flow may proceed to S2009, in which the steering assist control based on the lane line information may be performed, to end the program.

According to the second implementation of the technology, when detecting the branch road of the lane ahead of the own vehicle and the intention of the preceding vehicle followed by the own vehicle to change the lanes toward the branch road, the own vehicle that is accelerating may be prevented from accelerating. When the lane line information is obtained after the completion of the lane change performed by the preceding vehicle, the own vehicle may be allowed to accelerate while the steering control is performed on the basis of the lane line information. In contrast, when no lane line information is obtained, the own vehicle may be allowed to travel at a constant speed, and the steering control may be stopped in a case where there is occurrence of one or both of the lapse of the predetermined time or the driving operation performed by the driver. Thus, when detecting the branch road of the lane ahead of the own vehicle and the intention of the preceding vehicle followed by the own vehicle to change the lanes toward the branch road, it is possible to perform the steering control precisely depending on the information to be obtained by virtue of proper utilization of the lane line information and the preceding vehicle information, even in a case where the own vehicle is accelerating.

(Third Implementation)

Figure 8:
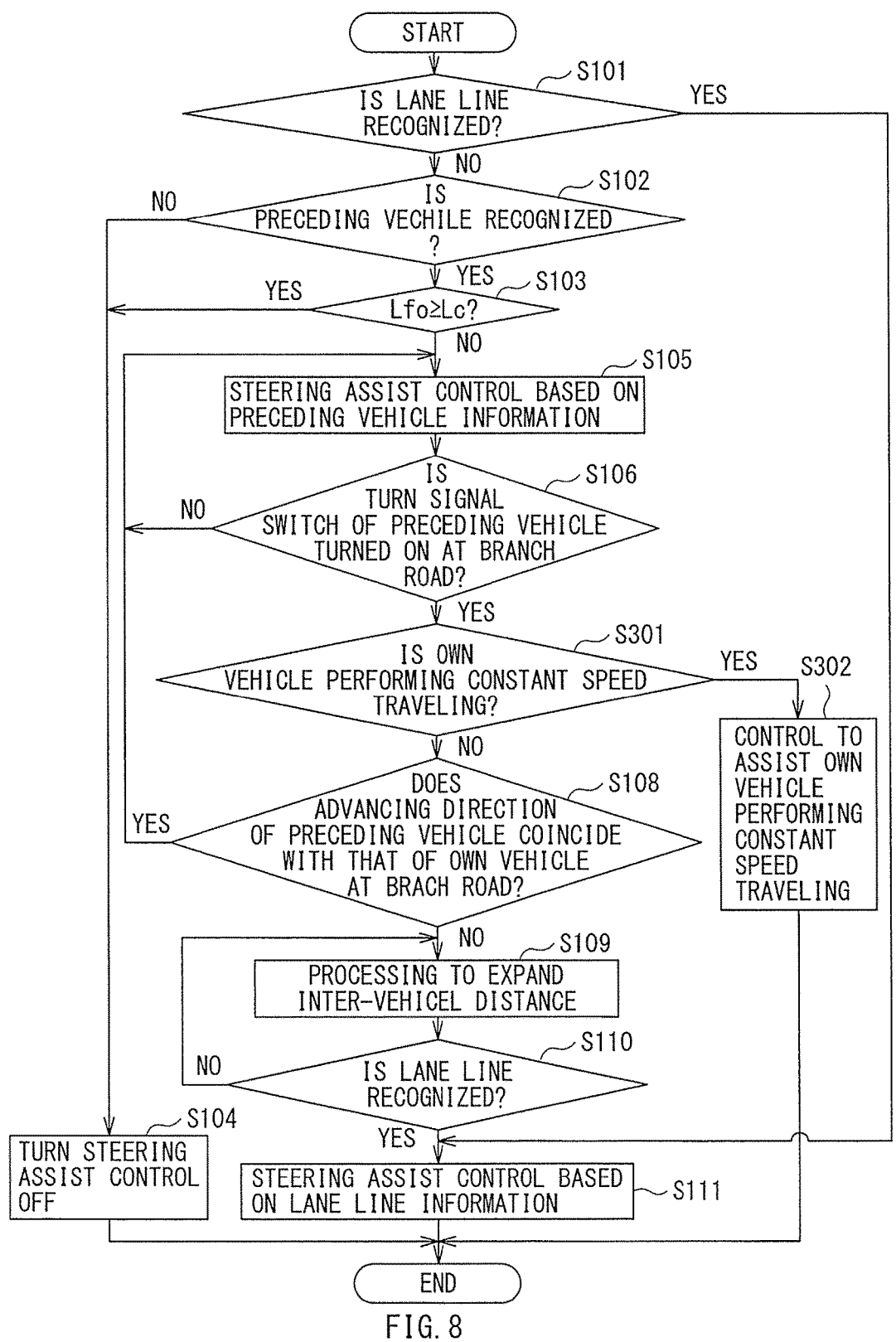
FIG. 8 is a flowchart of an example of a traveling control program according to a third implementation of the technology.
Figure 9:
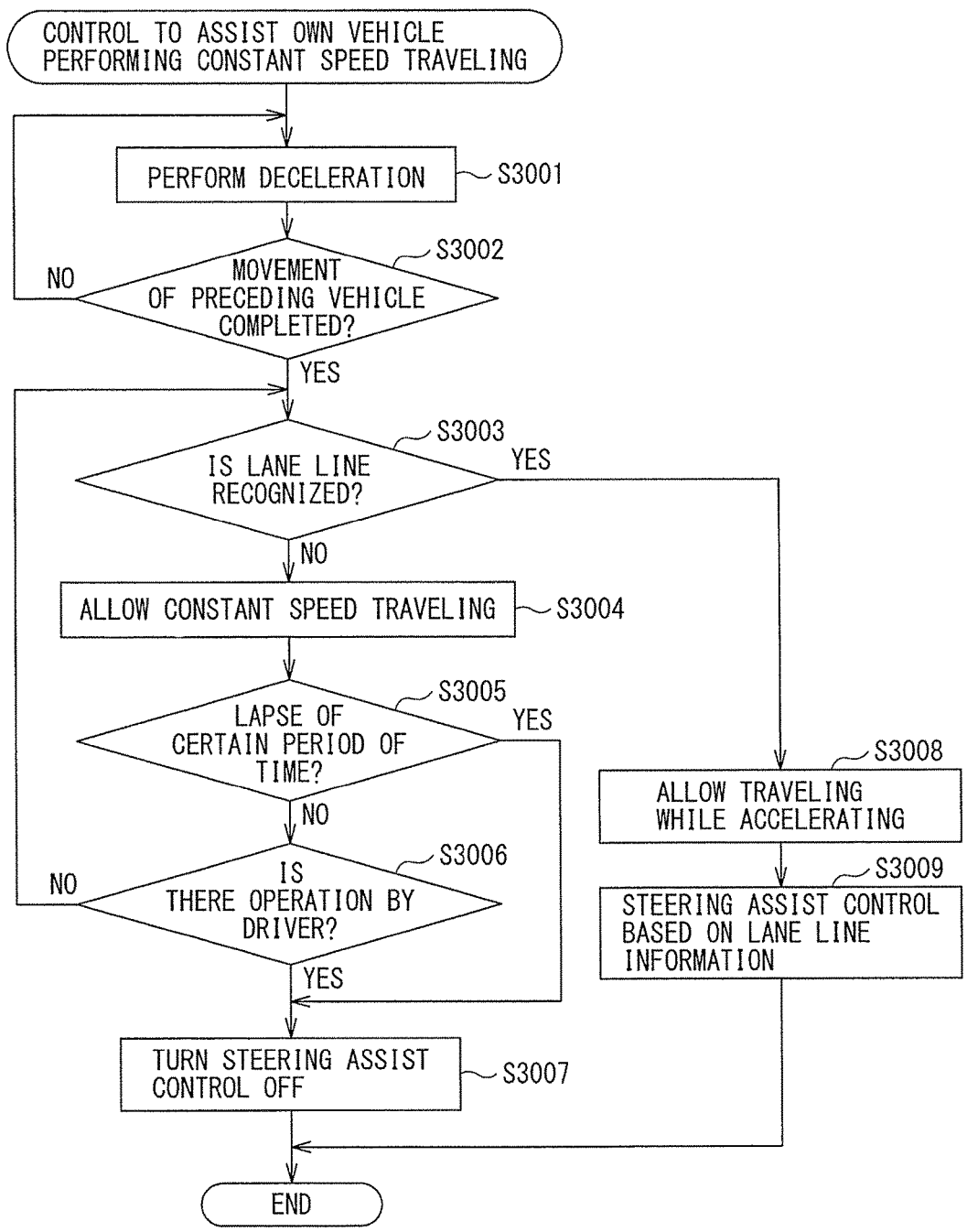
FIG. 9 is a flowchart of an example of a control to assist an own vehicle traveling at a constant speed (performing a constant speed traveling) according to the third implementation of the technology.

Next, description is given, with reference to FIGS. 8 and 9, on a third implementation of the technology. The third implementation of the technology is directed to an example where a control may be performed on the basis of determination as to whether the own vehicle is traveling at a constant speed. The control may be performed when detecting the branch road of the lane ahead of the own vehicle and the intention of the preceding vehicle followed by the own vehicle to change the lanes toward the branch road (a case of (YES) in S106 in FIG. 2 in the first implementation). Other components and functions and effects are similar to those in the first implementation of the technology, and thus the same reference symbol is assigned to the same component to omit a description therefor.

Referring to FIG. 8, the flow may proceed to S106 similarly to the first implementation of the technology. In S106, when the turn signal switch of the preceding vehicle is turned ON, and thus the determination is made that there is an intention of the preceding vehicle to change the lanes toward the branch road (cases in (b) and (c) of FIG. 5), the flow may proceed to S301.

In S301, determination may be made as to whether the own vehicle is traveling at a constant speed. When the own vehicle is traveling at a constant speed, the flow may proceed to S302, in which the later-described control to assist the own vehicle traveling at the constant speed may be performed. When the own vehicle is not traveling at the constant speed, the flow may proceed to S108. The processing in and after S108 is similar to the processing in the first implementation of the technology, and thus descriptions therefor are omitted.

Next, description is given, with reference to a flowchart in FIG. 9, on the above-described control to assist the own vehicle traveling at the constant speed in S302, performed on the basis of the determination made in the foregoing S301 that the own vehicle is traveling at the constant speed.

First, in S3001, the own vehicle may be allowed to decelerate.

Thereafter, the flow may proceed to S3002, in which determination may be made as to whether the movement of the preceding vehicle has been completed, i.e., whether the movement of the preceding vehicle toward the branch road has been completed after showing its intention to diverge by turning the turn signal switch ON.

When the movement of the preceding vehicle has not been completed as a result of the determination made in S3002, the processing from S3001 may be repeated. When the movement of the preceding vehicle has been completed, i.e., when the movement of the preceding vehicle toward the branch road has been completed after showing its intention to diverge by turning the turn signal switch ON, the flow may proceed to S3003. In S3003, determination may be made as to whether the lane line is recognizable.

When the lane line is not recognizable, the flow may proceed to S3004 to allow the own vehicle to travel at a constant speed.

Thereafter, the flow may proceed to S3005, in which determination may be made as to whether there is a lapse of a certain period of time which is previously set by means of an experiment or other means. When there is no lapse of the certain period of time, the flow may proceed to S3006, in which determination may be made as to whether there is any driving operation performed by the driver.

When determination is made that there is no driving operation performed by the driver as a result of the determination made in S3006, the processing from S3003 may be repeated.

When determination is made in S3005 that there is a lapse of the certain period of time, or when determination is made in S3006 that there is the driving operation performed by the driver, the flow may proceed to S3007. In S3007, the steering assist control may be turned OFF, to end the program. It is to be noted that, when the steering assist control is turned OFF, the driver may be informed to that effect on an as-needed basis by means of the display device 24 or the speaker 25.

In contrast, when the lane line is recognized in the foregoing S3003, the flow may proceed to S3008, in which the own vehicle may be allowed to travel while accelerating. Thereafter, the flow may proceed to S3009, in which the steering assist control based on the lane line information may be performed, to end the program.

According to the third implementation of the technology, when detecting the branch road of the lane ahead of the own vehicle and the intention of the preceding vehicle followed by the own vehicle to change the lanes toward the branch road, the own vehicle that is traveling at the constant speed may be allowed to decelerate. When the lane line information is obtained after the completion of the lane change performed by the preceding vehicle, the own vehicle may be allowed to accelerate while the steering control is performed on the basis of the lane line information. In contrast, when no lane line information is obtained, the own vehicle may be allowed to travel at the constant speed, and the steering control may be stopped in a case where there is occurrence of one or both of the lapse of the predetermined time or the driving operation performed by the driver. Thus, when detecting the branch road of the lane ahead of the own vehicle and the intention of the preceding vehicle followed by the own vehicle to change the lanes toward the branch road, it is possible to perform the steering control precisely depending on the information to be obtained by virtue of proper utilization of the lane line information and the preceding vehicle information even in a case where the own vehicle is traveling at the constant speed.

(Fourth Implementation)

Figure 10:
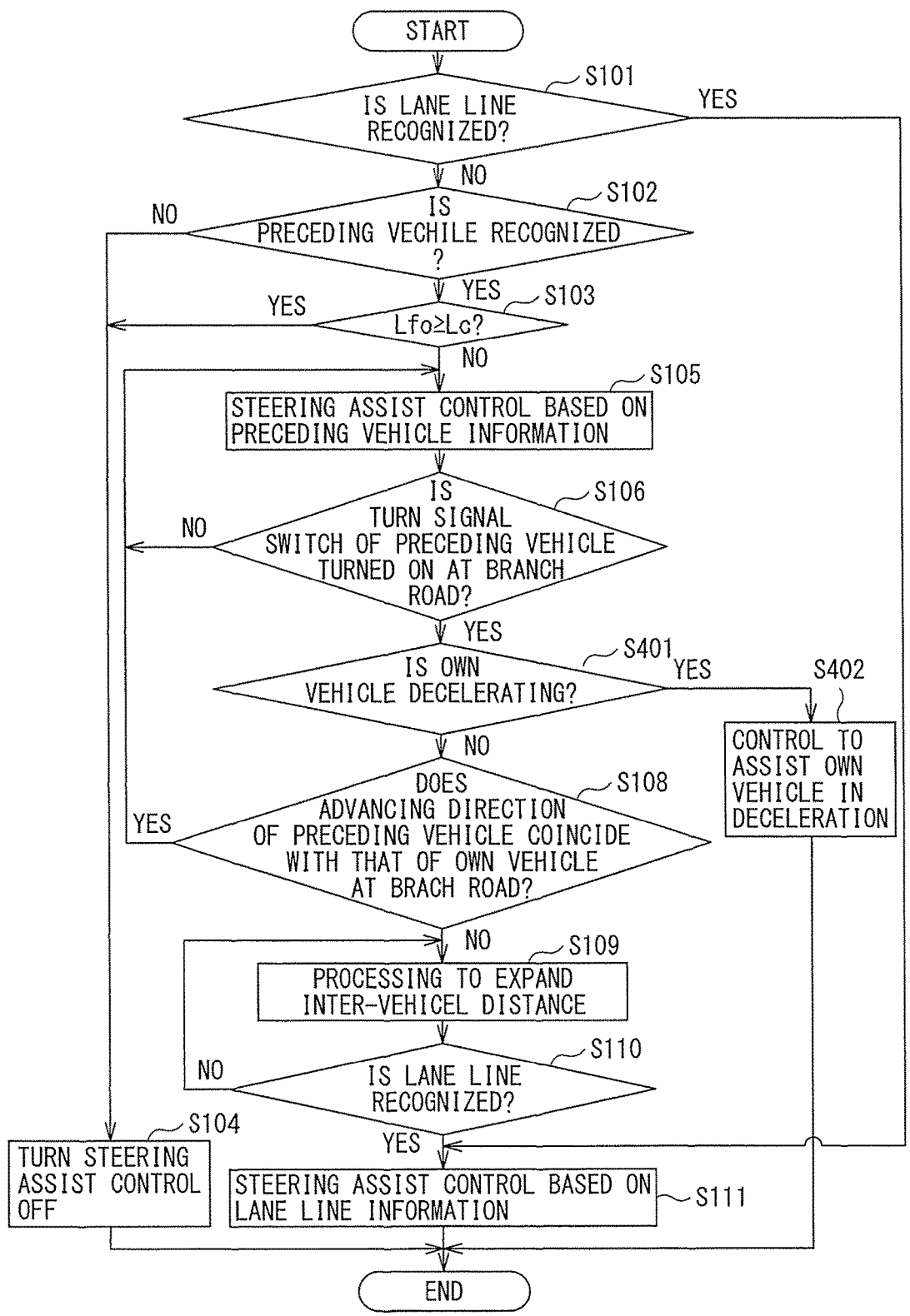
FIG. 10 is a flowchart of an example of a traveling control program according to a fourth implementation of the technology.
Figure 11:
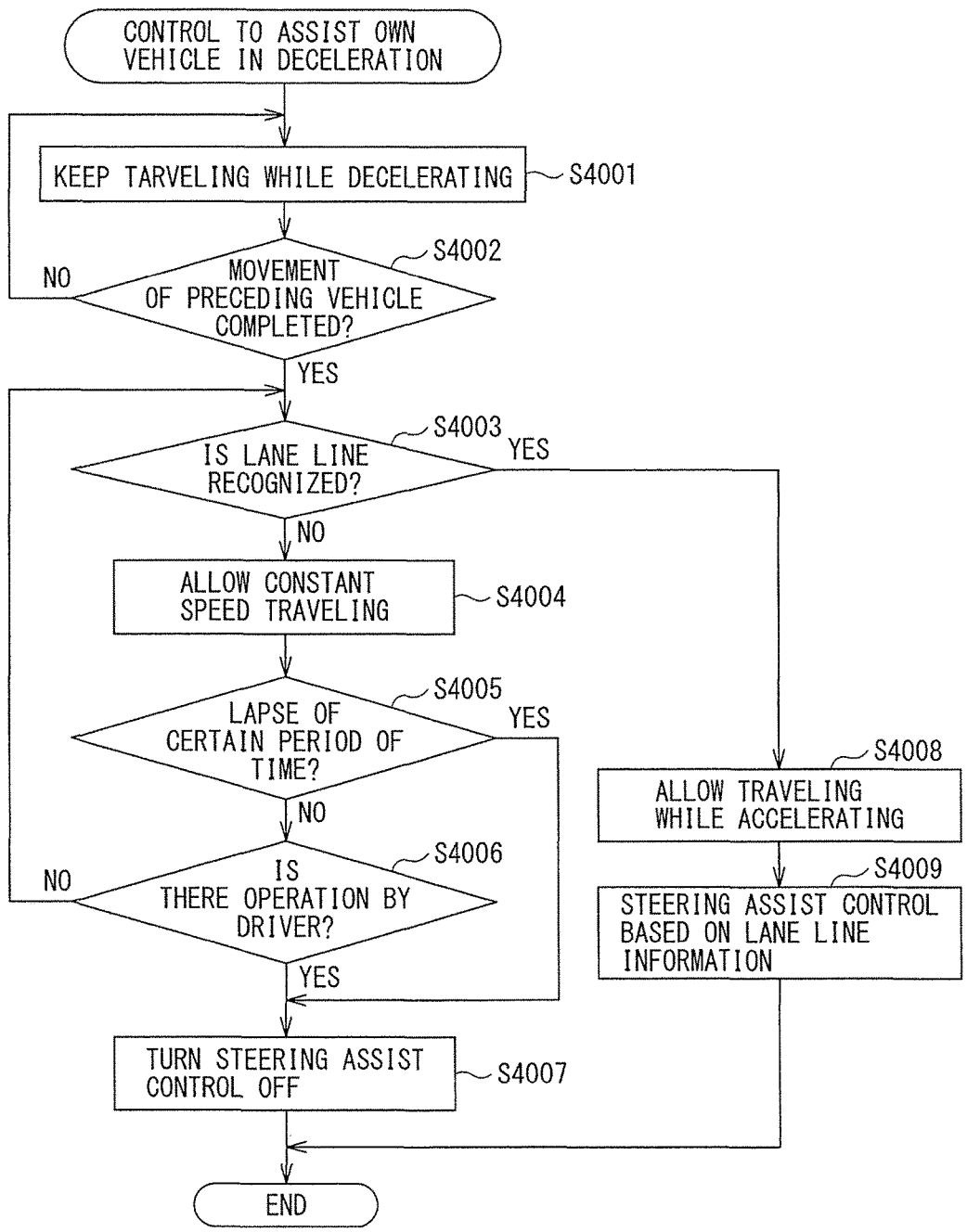
FIG. 11 is a flowchart of an example of a control to assist an own vehicle in deceleration according to the fourth implementation of the technology.

Next, description is given, with reference to FIGS. 10 and 11, on a fourth implementation of the technology. The fourth implementation of the technology is directed to an example where a control may be performed on the basis of determination as to whether the own vehicle is decelerating. The control may be performed when detecting the branch road of the lane ahead of the own vehicle and the intention of the preceding vehicle followed by the own vehicle to change the lanes toward the branch road (a case of (YES) in S106 in FIG. 2 in the first implementation). Other components and functions and effects are similar to those in the first implementation of the technology, and thus the same reference symbol is assigned to the same component to omit a description therefor.

Referring to FIG. 10, the flow may proceed to S106 similarly to the first implementation of the technology. In S106, when the turn signal switch of the preceding vehicle is turned ON, and thus the determination is made that there is an intention of the preceding vehicle to change the lanes toward the branch road (cases in (b) and (c) of FIG. 5), the flow may proceed to S401.

In S401, determination may be made as to whether the own vehicle is decelerating. When the own vehicle is decelerating, the flow may proceed to S402, in which the later-described control to assist the own vehicle in deceleration may be performed. When the own vehicle is not decelerating, the flow may proceed to S108. The processing in and after S108 is similar to the processing in the first implementation of the technology, and thus descriptions therefor are omitted.

Next, description is given, with reference to a flowchart in FIG. 11, on the above-described control to assist the own vehicle in deceleration in S402, performed on the basis of the determination made in the foregoing S401 that the own vehicle is decelerating.

First, in S4001, the own vehicle may be allowed to keep traveling while decelerating.

Thereafter, the flow may proceed to S4002, in which determination may be made as to whether the movement of the preceding vehicle has been completed, i.e., whether the movement of the preceding vehicle toward the branch road has been completed after showing its intention to diverge by turning the turn signal switch ON.

When the movement of the preceding vehicle has not been completed as a result of the determination made in S4002, the processing from S4001 may be repeated. When the movement of the preceding vehicle has been completed, i.e., when the movement of the preceding vehicle toward the branch road has been completed after showing its intention to diverge by turning the turn signal switch ON, the flow may proceed to S4003. In S4003, determination may be made as to whether the lane line is recognizable.

When the lane line is not recognizable, the flow may proceed to S4004 to allow the own vehicle to travel at a constant speed.

Thereafter, the flow may proceed to S4005, in which determination may be made as to whether there is a lapse of a certain period of time which is previously set by means of an experiment or other means. When there is no lapse of the certain period of time, the flow may proceed to S4006, in which determination may be made as to whether there is any driving operation performed by the driver.

When determination is made that there is no driving operation performed by the driver as a result of the determination made in S4006, the processing from S4003 may be repeated.

When determination is made in S4005 that there is a lapse of the certain period of time, or when determination is made in S4006 that there is the driving operation performed by the driver, the flow may proceed to S4007. In S4007, the steering assist control may be turned OFF, to end the program. It is to be noted that, when the steering assist control is turned OFF, the driver may be informed to that effect on an as-needed basis by means of the display device 24 or the speaker 25.

In contrast, when the lane line is recognized in the foregoing S4003, the flow may proceed to S4008, in which the own vehicle may be allowed to travel while accelerating. Thereafter, the flow may proceed to S4009, in which the steering assist control based on the lane line information may be performed, to end the program.

According to the fourth implementation of the technology, when detecting the branch road of the lane ahead of the own vehicle and the intention of the preceding vehicle followed by the own vehicle to change the lanes toward the branch road, the own vehicle that is decelerating may be allowed to keep decelerating. When the lane line information is obtained after the completion of the lane change performed by the preceding vehicle, the own vehicle may be allowed to accelerate while the steering control is performed on the basis of the lane line information. In contrast, when no lane line information is obtained, the own vehicle may be allowed to travel at the constant speed, and the steering control may be stopped in a case where there is occurrence of one or both of the lapse of the predetermined time or the driving operation performed by the driver. Thus, when detecting the branch road of the lane ahead of the own vehicle and the intention of the preceding vehicle followed by the own vehicle to change the lanes toward the branch road, it is possible to perform the steering control precisely depending on the information to be obtained by virtue of proper utilization of the lane line information and the preceding vehicle information, even in a case where the own vehicle is decelerating.

According to an implementation of the technology, the steering control may be performed on the basis of the lane line information, when only the lane line information is obtained and when both the lane line information and the preceding vehicle information are obtained. When the inter-vehicle distance between the own vehicle and the preceding vehicle is small, and thus it is difficult to obtain the lane line information, the steering control to follow the preceding vehicle may be performed. When detecting the branch road of the lane ahead of the own vehicle and the information on ON of the turn signal switch of the preceding vehicle followed by the own vehicle to show the intention of the preceding vehicle to change the lanes toward the branch road, the control may be performed to allow the inter-vehicle distance between the own vehicle and the preceding vehicle to be expanded to the distance at which the lane line information is obtainable. In this case, the determination may be made as to whether the diverging direction of the preceding vehicle coincides with the target course of the own vehicle. When the advancing route of the preceding vehicle that advances toward the branch road coincides with the target course of the own vehicle, the steering control to follow the preceding vehicle may be performed. When detecting the branch road of the lane ahead of the own vehicle and the intention of the preceding vehicle followed by the own vehicle to change the lanes toward the branch road, the steering control may be performed on the basis of the status of obtaining the lane line information after the completion of the lane change performed by the preceding vehicle, depending on the traveling state of the own vehicle. Thus, it is possible to avoid the following possibility. That is, it is possible to avoid, for example, the possibility that, when the own vehicle automatically follows the preceding vehicle upon obtaining only the preceding vehicle information, the own vehicle may end up in diverging to the branch road or other roads while following the preceding vehicle that also diverges to the branch road, causing the own vehicle to unintentionally deviate from the lane. Therefore, it becomes possible to perform a steering control precisely depending on information to be obtained, utilizing the lane line information and the preceding vehicle information properly.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
a traveling environment information obtaining unit that obtains traveling environment information, the traveling environment information including at least lane line information of a lane along which an own vehicle travels and preceding vehicle information;
a traveling information detector that detects traveling information of the own vehicle; and
a controller that performs a steering control based on the traveling environment information and the traveling information, wherein
when the traveling environment information obtaining unit obtains at least the lane line information, the controller performs the steering control to cause the own vehicle to travel along a middle of the lane which is set based on the lane line information, and
when the traveling environment information obtaining unit fails to obtain the lane line information and obtains the preceding vehicle information, the controller performs the steering control to cause the own vehicle to travel along a traveling locus of the preceding vehicle which is set based on the preceding vehicle information.

2. The vehicle traveling control apparatus according to claim 1, wherein the traveling environment information obtaining unit fails to obtain the lane line information as a result that an inter-vehicle distance between the own vehicle and a preceding vehicle is smaller than a predetermined distance.

3. The vehicle traveling control apparatus according to claim 2, wherein the controller performs a control to allow the inter-vehicle distance between the own vehicle and the preceding vehicle to be expanded to a distance at which the lane line information is obtainable, when the traveling environment information obtaining unit detects both a branch road of the lane ahead of the own vehicle and an intention of the preceding vehicle of changing the lanes toward the branch road, the preceding vehicle being followed by the own vehicle.

4. The vehicle traveling control apparatus according to claim 3, wherein the controller determines whether an advancing route of the preceding vehicle that advances toward the branch road coincides with a target course of the own vehicle, and performs the steering control to allow the own vehicle to follow the preceding vehicle on a condition that the advancing route of the preceding vehicle coincides with the target course of the own vehicle, when the traveling environment information obtaining unit detects both the branch road of the lane ahead of the own vehicle and the intention of the preceding vehicle of changing the lanes toward the branch road, the preceding vehicle being followed by the own vehicle.

5. The vehicle traveling control apparatus according to claim 3, wherein the controller performs, depending on a traveling state of the own vehicle, the steering control based on a status of obtaining the lane line information after completion of the lane change performed by the preceding vehicle, when the traveling environment information obtaining unit detects both the branch road of the lane ahead of the own vehicle and the intention of the preceding vehicle of changing the lanes toward the branch road, the preceding vehicle being followed by the own vehicle.

6. The vehicle traveling control apparatus according to claim 4, wherein the controller performs, depending on a traveling state of the own vehicle, the steering control based on a status of obtaining the lane line information after completion of the lane change performed by the preceding vehicle, when the traveling environment information obtaining unit detects both the branch road of the lane ahead of the own vehicle and the intention of the preceding vehicle of changing the lanes toward the branch road, the preceding vehicle being followed by the own vehicle.

7. The vehicle traveling control apparatus according to claim 5, wherein,
when the traveling environment information obtaining unit detects both the branch road of the lane ahead of the own vehicle and the intention of the preceding vehicle, followed by the own vehicle, of changing the lanes toward the branch road,
the controller prevents the own vehicle from starting, on a condition that the own vehicle is stopped,
the controller allows the own vehicle to start while performing the steering control based on the lane line information, on a condition that the traveling environment information obtaining unit obtains the lane line information after the completion of the lane change performed by the preceding vehicle, and
the controller prevents the own vehicle from starting, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

8. The vehicle traveling control apparatus according to claim 6, wherein,
when the traveling environment information obtaining unit detects both the branch road of the lane ahead of the own vehicle and the intention of the preceding vehicle, followed by the own vehicle, of changing the lanes toward the branch road,
the controller prevents the own vehicle from starting, on a condition that the own vehicle is stopped,
the controller allows the own vehicle to start while performing the steering control based on the lane line information, on a condition that the traveling environment information obtaining unit obtains the lane line information after the completion of the lane change performed by the preceding vehicle, and
the controller prevents the own vehicle from starting, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

9. The vehicle traveling control apparatus according to claim 5, wherein,
when the traveling environment information obtaining unit detects both the branch road of the lane ahead of the own vehicle and the intention of the preceding vehicle, followed by the own vehicle, of changing the lanes toward the branch road,
the controller prevents the own vehicle from accelerating, on a condition that the own vehicle is accelerating,
the controller allows the own vehicle to accelerate while performing the steering control based on the lane line information, on a condition that the traveling environment information obtaining unit obtains the lane line information after the completion of the lane change performed by the preceding vehicle, and
the controller prevents the own vehicle from accelerating to allow performing a constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

10. The vehicle traveling control apparatus according to claim 6, wherein,
when the traveling environment information obtaining unit detects both the branch road of the lane ahead of the own vehicle and the intention of the preceding vehicle, followed by the own vehicle, of changing the lanes toward the branch road,
the controller prevents the own vehicle from accelerating, on a condition that the own vehicle is accelerating,
the controller allows the own vehicle to accelerate while performing the steering control based on the lane line information, on a condition that the traveling environment information obtaining unit obtains the lane line information after the completion of the lane change performed by the preceding vehicle, and
the controller prevents the own vehicle from accelerating to allow performing a constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

11. The vehicle traveling control apparatus according to claim 5, wherein,
when the traveling environment information obtaining unit detects both the branch road of the lane ahead of the own vehicle and the intention of the preceding vehicle, followed by the own vehicle, of changing the lanes toward the branch road,
the controller allows the own vehicle to decelerate, on a condition that the own vehicle performs a constant speed traveling,
the controller allows the own vehicle to accelerate while performing the steering control based on the lane line information, on a condition that the traveling environment information obtaining unit obtains the lane line information after the completion of the lane change performed by the preceding vehicle, and
the controller allows the own vehicle to perform the constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

12. The vehicle traveling control apparatus according to claim 6, wherein,
when the traveling environment information obtaining unit detects both the branch road of the lane ahead of the own vehicle and the intention of the preceding vehicle, followed by the own vehicle, of changing the lanes toward the branch road,
the controller allows the own vehicle to decelerate, on a condition that the own vehicle performs a constant speed traveling,
the controller allows the own vehicle to accelerate while performing the steering control based on the lane line information, on a condition that the traveling environment information obtaining unit obtains the lane line information after the completion of the lane change performed by the preceding vehicle, and the controller allows the own vehicle to perform the constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

13. The vehicle traveling control apparatus according to claim 5, wherein, when the traveling environment information obtaining unit detects both the branch road of the lane ahead of the own vehicle and the intention of the preceding vehicle, followed by the own vehicle, of changing the lanes toward the branch road, the controller allows the own vehicle to keep decelerating, on a condition that the own vehicle is decelerating, the controller allows the own vehicle to accelerate while performing the steering control based on the lane line information, on a condition that the traveling environment information obtaining unit obtains the lane line information after the completion of the lane change performed by the preceding vehicle, and the controller allows the own vehicle to perform a constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

14. The vehicle traveling control apparatus according to claim 6, wherein, when the traveling environment information obtaining unit detects both the branch road of the lane ahead of the own vehicle and the intention of the preceding vehicle, followed by the own vehicle, of changing the lanes toward the branch road, the controller allows the own vehicle to keep decelerating, on a condition that the own vehicle is decelerating, the controller allows the own vehicle to accelerate while performing the steering control based on the lane line information, on a condition that the traveling environment information obtaining unit obtains the lane line information after the completion of the lane change performed by the preceding vehicle, and the controller allows the own vehicle to perform a constant speed traveling, and stops the steering control upon occurrence of one or both of a lapse of a predetermined time and a driving operation performed by a driver, on a condition that the traveling environment information obtaining unit does not obtain the lane line information after the completion of the lane change performed by the preceding vehicle.

15. A vehicle traveling control apparatus comprising:

a traveling environment information obtaining unit that obtains traveling environment information, the traveling environment information including at least lane line information of a lane along which an own vehicle travels and preceding vehicle information;

a traveling information detector that detects traveling information of the own vehicle; and a controller that performs a steering control based on the traveling environment information and the traveling information, wherein when the traveling environment information obtaining unit detects that an inter-vehicle distance between the own vehicle and a preceding vehicle is smaller than a predetermined distance, the controller performs a control to allow the own vehicle to follow the preceding vehicle and to expand the inter-vehicle distance between the own vehicle and the preceding vehicle at least to the predetermined distance and then the controller performs the steering control to cause the own vehicle to travel along a middle of the lane which is set based on the lane line information.

16. The vehicle traveling control apparatus according to claim 15, wherein when the traveling environment information obtaining unit obtains at least the lane line information, the controller performs the steering control to cause the own vehicle to travel along the middle of the lane which is set based on the lane line information.

17. The vehicle traveling control apparatus according to claim 15, wherein when the traveling environment information obtaining unit detects that the inter-vehicle distance between the own vehicle and a preceding vehicle is smaller than the predetermined distance, the controller performs the steering control to cause the own vehicle to travel along a traveling locus of the preceding vehicle which is set based on the preceding vehicle information.

* * * * *